United States Patent [19]

Yamamoto et al.

[11] Patent Number: 5,182,352
[45] Date of Patent: Jan. 26, 1993

[54] MOLDING MATERIALS

[75] Inventors: Toshihiro Yamamoto; Masao Kimura; Keiichi Saito, all of Kawasaki, Japan

[73] Assignees: Nippon Steel Chemical Co., Ltd.; Nippon Steel Corp., Tokyo, Japan

[21] Appl. No.: 860,007

[22] Filed: Mar. 30, 1992

[30] Foreign Application Priority Data

Mar. 29, 1991 [JP] Japan .................. 3-089331

[51] Int. Cl.$^5$ .......................... C08F 220/14
[52] U.S. Cl. ................................ 526/329.2
[58] Field of Search ..................... 526/329.2

[56] References Cited

U.S. PATENT DOCUMENTS

| | | | |
|---|---|---|---|
| 3,072,622 | 1/0963 | Hain | 526/329.2 |
| 3,080,348 | 3/1963 | Lang et al. | 526/329.2 |
| 3,135,723 | 6/1964 | Vandegaer . | |
| 3,427,275 | 2/1969 | Davis et al. | 526/329.2 |
| 3,466,269 | 9/1969 | Fivel | 526/329.2 |
| 3,629,211 | 12/1971 | Nazaki | 526/329.2 |
| 3,681,305 | 8/1972 | Tirpak et al. | 526/329.2 |
| 4,001,484 | 1/1977 | Song | 526/329.2 |
| 4,086,410 | 4/1978 | Song | 526/329.2 |
| 4,137,389 | 1/1979 | Wingler et al. | 526/329.2 |
| 4,237,257 | 12/1980 | Moriya et al. | 526/329.2 |
| 4,327,202 | 4/1982 | Foley, Jr. | 526/329.2 |
| 4,439,589 | 3/1984 | Alberts et al. | 526/329.2 |
| 4,529,787 | 7/1985 | Schmidt et al. | 526/329.2 |
| 4,533,689 | 8/1985 | Tayoma et al. | 526/329.2 |
| 4,782,127 | 11/1988 | Van Nuffel | 526/329.2 |

FOREIGN PATENT DOCUMENTS

| | | | |
|---|---|---|---|
| 43-9753 | 4/1968 | Japan . | |
| 48-95490 | 12/1973 | Japan . | |
| 56-139513 | 10/1981 | Japan | 526/329.2 |
| 57-153008 | 9/1982 | Japan . | |
| 58-61108 | 4/1983 | Japan | 526/329.2 |
| 58-68251 | 4/1983 | Japan | 526/329.2 |
| 58-68253 | 4/1983 | Japan | 526/329.2 |
| 58-221801 | 12/1983 | Japan | 526/329.2 |
| 61-142551 | 6/1986 | Japan | 526/329.2 |
| 61-281106 | 12/1986 | Japan | 526/329.2 |

Primary Examiner—Joseph L. Schofer
Assistant Examiner—N. Sarofim
Attorney, Agent, or Firm—Birch, Stewart, Kolasch & Birch

[57] ABSTRACT

Molding materials of this invention comprise copolymers consisting essentially of 10 to 30% by weight of α-methylstryene units. 40 to 70% by weight of methyl methacrylate and 10 to 30% by weight of stryene units with a weight average molecular weight in the range from 50,000 to 200,000, a melt flow rate (MFR) in the range from 4 to 18 g./10 min. at 220° C. under a 10-kg load, and a Vicat softening point of 130° C. or more, show a high degree of transparency, good heat and weather resistance and good moldability and are best suited for such uses as automotive and electrical parts.

1 Claim, No Drawings

MOLDING MATERIALS

FIELD OF THE INVENTION AND RELATED ART STATEMENT

This invention relates to molding materials comprising α-methylstyrene-methyl methacrylate-styrene copolymers and, more particularly, to molding materials comprising α-methylstyrene-methyl methacrylate-styrene copolymers with a high degree of transparency, good heat and weather resistance, and excellent moldability.

Poly(methyl methacrylate) and polystyrene are typical examples of transparent resins known thus far. Because of their relatively low price, high transparency and good moldability, they are used extensively in a variety of molding applications. These transparent resins, however, do not possess sufficient heat resistance and this defect places certain restrictions on their applications. On the other hand, polycarbonates and polyarylates are known as heat-resistant transparent resins, but they are difficult to mold because of their high melt viscosity and also restricted in their applications.

A number of means have been devised for the preparation of resins of high heat resistance and good moldability. For example, the following processes are disclosed for improvement of the heat resistance: copolymerization of methyl methacrylate and α-methylstyrene (U.S. Pat. No. 3,135,723); polymerization of methyl methacrylate with partial crosslinking [Japan Kokai Tokkyo Koho No. 48-95,490 (1973)]; copolymerization of methyl methacrylate and allylmaleimide [Japan Kokoku Tokkyo Koho No. 43-9,753 (1968)]; and copolymerization of methyl methacrylate, styrene and maleic anhydride [Japan Kokai Tokkyo Koho No. 57-153,008 (1982)]. The resins produced by the aforesaid processes, however, all show high melt viscosity and are difficult to mold.

OBJECT AND SUMMARY OF THE INVENTION

It is an object of this invention to provide molding materials with high heat resistance and good moldability.

Another object of this invention is to provide molding materials comprising α-methylstyrene-methyl methacrylate-styrene copolymers with high heat resistance and good moldability useful for such uses as automotive and electrical parts.

This invention thus relates to molding materials comprising copolymers consisting essentially of 10 to 30% by weight of α-methylstyrene units, 40 to 70% by weight of methyl methacrylate units and 10 to 30% by weight of styrene units with a weight average molecular weight in the range from 50,000 to 200,000, a melt flow rate in the range from 4 to 18 g./10 min. at 220° C. under a 10-kg load and a Vicat softening point of 130° C. or more.

In this invention, the weight average molecular weight (calibrated with polystyrene) of the molding materials is in the range from 50,000 to 200,000, preferably from 70,000 to 150,000. Molding materials with a weight average molecular weight of less than 50,000 are not suitable as they degrade in their mechanical properties. On the other hand, molding materials with a weight average molecular weight in excess of 200,000 are not suitable either as they undesirably discolor during molding or are affected adversely in moldability by their too high melt viscosity.

The molding materials of this invention are consisting essentially of 10 to 30% by weight of α-methylstyrene units, 40 to 70% by weight of methyl methacrylate units and 10–30% by weight of styrene units, preferably 15 to 25% by weight of α-methylstyrene units, 50 to 65% by weight of methyl methacrylate units and 10 to 25% by weight of styrene units. Less than 10% by weight of the α-methylstyrene units in the copolymers improves the heat resistance not so much as expected while more than 30% by weight enhances the melt viscosity to such a level as to cause problems in moldability. Likewise, less than 40% by weight of the methyl methacrylate units improves the heat resistance not so much as expected while more than 70% by weight adversely affects the flow properties and presents problems in moldability. As for the styrene units, less than 10% by weight adversely affects the flow properties while more than 30% by weight markedly reduces the heat resistance.

The molding materials of this invention show a melt flow rate (MFR) in the range from 4 to 18 g./10 min. at 220° C. under a 10-kg load. Molding materials with MFR of lower than 4 g./10 min. are too high in melt viscosity to provide adequate moldability. On the other hand, molding materials with MFR in excess of 18 g./10 min. do not have sufficiently high heat resistance.

The molding materials of this invention are prepared desirably by differential polymerization such as continuous bulk or solution polymerization in a complete mixing type reactor in order to ensure uniform composition and molecular weight and good appearance. They may also be prepared by batch type reactor.

As for polymerization initiators, it is possible to apply peroxides and/or azo compounds normally used in radical polymerization. It is also allowable to add a chain transfer agent such as alkyl mercaptan in a suitable amount to control the molecular weight.

Additives such as mold release agents, ultraviolet absorbers, antioxidants, heat stabilizers and antistatic agents and dyes for coloration may be incorporated, as needed, into the molding materials of this invention in such quantities as not to affect adversely their transparency and other key properties.

The molding materials of this invention are transparent and heat-and weather-resistant with good moldability and best suited for such uses as automotive and electrical parts.

DETAILED DESCRIPTION OF THE PREFERRED EMBODIMENT

This invention will be described in detail with reference to the accompanying examples and comparative examples, though not limited thereto. The testing methods employed are as follows.

Molecular Weight

The weight average molecular weight is determined by gel permeation chromatography with calibration by polystyrene.

Composition of Monomer Units in Copolymers

The composition of monomer units is determined from the ratio of chromatogram area for each monomer by pyrolysis gas chromatography.

Molding

The materials are molded by an injection molding machine (MINI MAX MOLDER MODEL CS-183 manufactured by Custom Scientific Instruments, Inc.).

Melt Flow Rate (MFR)

The melt flow rate is determined in accordance with JIS K 7210 at 220° C. under a 10-kg load.

Vicat Softening Point (VSP)

The Vicat softening point is determined in accordance with JIS K 7206 under a 1-kg load.

Tensile Impact Strength

The tensile impact strength is determined by a tensile impact tester (MINI MAX IMPACT TESTER manufactured by Custom Scientific Instruments, Inc.).

EXAMPLES 1 TO 3 AND COMPARATIVE EXAMPLE 1

The monomers and 2,2-bis(4,4-di-tert-butylperoxycyclohexyl)propane as initiator were introduced into a 50-ml. autoclave at the proportion and concentration shown in Table 1 and subjected to bulk polymerization at 120° C. for 7 hours. The resulting copolymers showed a tensile impact strength (kg-cm) of 0.9 in Example 1, 1.2 in Example 2 and 0.9 in Example 3. Other results are shown in Table 2.

COMPARATIVE EXAMPLE 2

Commercial styrene-methyl methacrylate copolymer (containing 40% by weight of styrene units) was molded and tested for their properties.

The results are shown in Table 2.

TABLE 1

|  | Feed composition (wt. %) | | | Initiator concentration (wt. %) |
| --- | --- | --- | --- | --- |
|  | αMSt | MMA | St |  |
| Example 1 | 30 | 60 | 10 | 0.16 |
| Example 2 | 30 | 55 | 15 | 0.21 |
| Example 3 | 30 | 50 | 20 | 0.21 |
| Comparative Example 1 | 30 | 70 | — | 0.15 |

(Notes)
αMSt: α-Methylstyrene
MMA: Methyl methacrylate
St: Styrene

TABLE 2

|  | Composition of monomer unit in copolymer (wt. %) | | | Mol. wt. $(M_w)$ $(\times 10^3)$ | MFR (g/10 min.) | VSP (°C.) |
| --- | --- | --- | --- | --- | --- | --- |
|  | αMSt | MMA | St |  |  |  |
| Example 1 | 23 | 62 | 15 | 90 | 4.4 | 137 |
| Example 2 | 22 | 58 | 20 | 92 | 7.9 | 132 |
| Example 3 | 23 | 52 | 25 | 98 | 15.1 | 130 |
| Comparative Example 1 | 22 | 78 | — | 91 | 0.5 | 142 |
| Comparative Example 2 | — | 60 | 40 | 181 | 17.6 | 102 |

What is claimed is:

1. Molding materials comprising copolymers consisting essentially of 10 to 30% by weight of α-methylstyrene units, 40 to 70% by weight of methyl methacrylate units and 10 to 30% by weight of styrene units with a weight average molecular weight in the range from 50,000 to 200,000, a melt flow rate (MFR) in the range from 4 to 18 g./10 min. at 220° C. under a 10-kg load and a Vicat softening point of 130° C. or more.

* * * * *